United States Patent [19]

Davies et al.

[11] Patent Number: 5,931,907
[45] Date of Patent: Aug. 3, 1999

[54] SOFTWARE AGENT FOR COMPARING LOCALLY ACCESSIBLE KEYWORDS WITH META-INFORMATION AND HAVING POINTERS ASSOCIATED WITH DISTRIBUTED INFORMATION

[75] Inventors: Nicholas John Davies, Colchester; Richard Weeks, Felixstowe, both of United Kingdom

[73] Assignee: British Telecommunications public limited company, London, United Kingdom

[21] Appl. No.: 08/875,091

[22] PCT Filed: Jan. 23, 1996

[86] PCT No.: PCT/GB96/00132

§ 371 Date: Jul. 22, 1997

§ 102(e) Date: Jul. 22, 1997

[87] PCT Pub. No.: WO96/23265

PCT Pub. Date: Aug. 1, 1996

[51] Int. Cl.[6] .................................................. G06F 17/30
[52] U.S. Cl. .......................... 709/218; 709/219; 709/201; 709/202; 709/203; 707/10; 707/102; 707/501; 707/515; 707/513
[58] Field of Search ......................... 395/200.48, 200.47, 395/200.49, 200.58, 200.57, 200.36; 707/501, 513, 10; 709/218, 219, 201, 202, 203

[56] References Cited

U.S. PATENT DOCUMENTS

| 5,408,655 | 4/1995 | Oren et al. ............................... 707/501 |
| 5,428,778 | 6/1995 | Brookes . |
| 5,446,891 | 8/1995 | Kaplan et al. ........................... 707/513 |
| 5,530,852 | 6/1996 | Meske, Jr. et al. ...................... 707/501 |
| 5,537,586 | 7/1996 | Amram et al. ............................... 707/3 |
| 5,619,615 | 4/1997 | Pitchaikani et al. ...................... 706/10 |
| 5,623,652 | 4/1997 | Vora et al. ................................ 707/10 |
| 5,649,186 | 7/1997 | Ferguson .................................. 707/513 |
| 5,694,594 | 12/1997 | Chang ..................................... 707/501 |
| 5,717,923 | 2/1998 | Dedrick ................................... 707/102 |
| 5,717,925 | 2/1998 | Harper et al. ........................... 707/102 |
| 5,727,175 | 3/1998 | Malone et al. .......................... 345/356 |
| 5,752,055 | 5/1998 | Redpath et al. ........................ 707/515 |
| 5,754,938 | 5/1998 | Herz et al. .............................. 707/501 |
| 5,754,939 | 5/1998 | Herz et al. .............................. 455/4.2 |
| 5,761,662 | 6/1998 | Dasan ........................................ 707/10 |
| 5,784,608 | 7/1998 | Meske, Jr. et al. ......................... 707/2 |
| 5,790,116 | 8/1998 | Malone et al. .......................... 345/335 |
| 5,819,273 | 10/1998 | Vora et al. ............................... 707/10 |

FOREIGN PATENT DOCUMENTS

| 0361464 A3 | 4/1990 | European Pat. Off. . |
| A 0 361 464 | 4/1990 | European Pat. Off. . |

OTHER PUBLICATIONS

"The Harvest Information Discovery and Access System", Bowman et al., presented Jul. 1994, WWW Conference '94 "Mosaic and the Web", 2nd International.

Davies et al, "Jasper: Communicating Information Agents for WWW", Jan. 1996.

Koster, Guidelines for Robot Writers, 1993.

Woelk et al, "The InfoSleuth Project:Intelligent Search Management Via Semantic Agents", presented Jul. 1994, WWW Conference '94 "Mosaic and the Web", 2nd International.

(List continued on next page.)

*Primary Examiner*—Zarni Maung
*Assistant Examiner*—William D. Thomson
*Attorney, Agent, or Firm*—Nixon & Vanderhye P.C.

[57] ABSTRACT

A system for accessing information stored in a distributed information database provides a community of intelligent software agents. Each agent can be built as an extension of a known viewer for a distributed information system such as the Internet WorldWide Web. The agent is effectively integrated with the viewer and can extract pages by means of the viewer for storage in an intelligent page store. The text from the information system is abstracted and is stored with additional information, optionally selected by the user. The agent-based access system uses keyword sets to locate information of interest to a user, together with user profiles such that pages being stored by one user can be notified to another whose profile indicates potential interest. The keyword sets can be extended by use of a thesaurus.

34 Claims, 6 Drawing Sheets

OTHER PUBLICATIONS

Bowman et al, "The Harvest Information Discovery and Access System", presented Jul. 1994, WWW Conference '94 "Mosaic and the Web", $2^{nd}$ International.

De Bra et al, "Searching for Arbitrary Information in the WWW:the Fish–Search fir Mosaic", presented Jul. 1994, WWW Conference '94 "Mosaic and the Web", $2^{nd}$ International.

SIGIR '94, Proceedings of the Seventeenth Annual International ACM–SIGIR Conference on Research and Development in Information Retrieval, Proceedin $17^{th}$ International Conference on Research and Development in Information Retrieval. SIGIR 94, DUB, ISBN 3–540–19889–X, 1994, Berlin, Germany, Springer–Verlag, Germany, pp. 272–281, XP002000951 Morita M et al: "Information filtering based on user beha analysis and best match text retrieval" see p. 272, line 1—p.275, line 1.

Proceedings of the Conference on Artificial Intelligence for Applications, Orlando, Mar. 1–5, 1993, No. Conf. 9, Mar. 1, 1993, Institute of Electrical and Electr Engineers, pp. 345–352, XP000379626 Beerud Sheth et al: "Evolving Agents for Personalized Information Filtering" see p. 348, col. 2, line 4—p. 351, col. 2, lin.

Communications of the Association for Computing Machinery, vol. 33, No. 11, Nov. 1, 1990, pp. 88–97, XP000173090 Jacobs P S et al: "Scisor: Extracting Information Fro Line News" see p. 88, line 1—age 92, col. 1, line 18.

IEICE Transactions on Information and Systems, vol. E75—D, No. 2, Mar. 1, 1992, p. 209, XP000301167 Jennings A et al: A Personal News Service Based on a User Mode Neural Network: see she whole document.

Communications of the ACM, Dec. 1992, USA, vol. 35, No. 12, ISSN 0001–0782, pp. 61–70, XP002000952 Goldberg D et al: "Using collaborative filtering to weave an information tapestry" se 61, line 1—p. 64, col. 3, line 37.

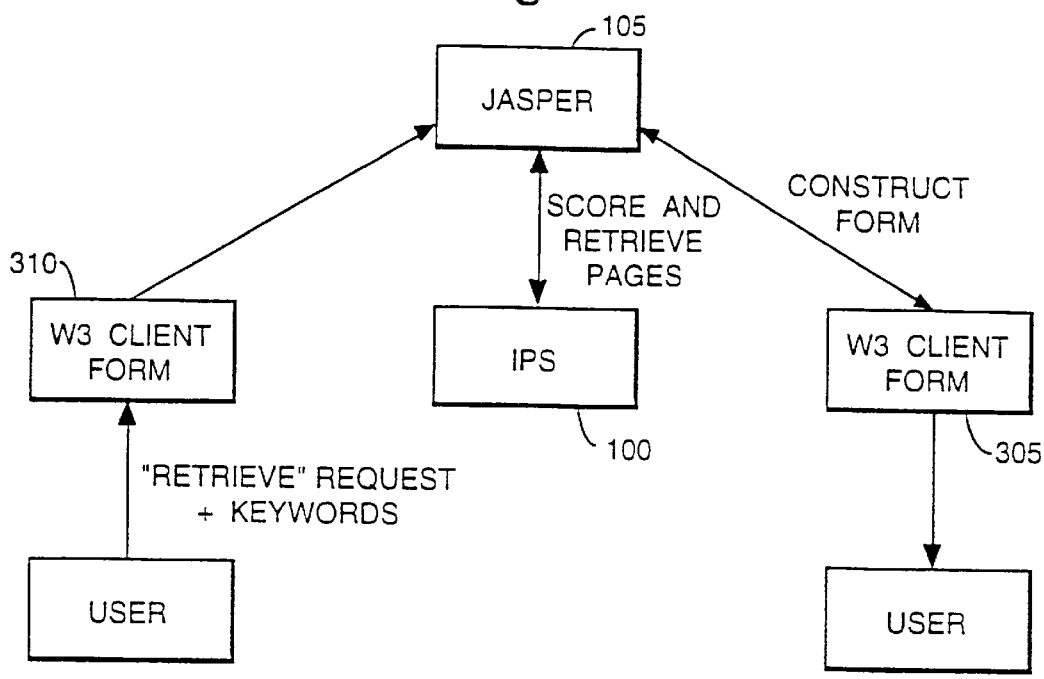
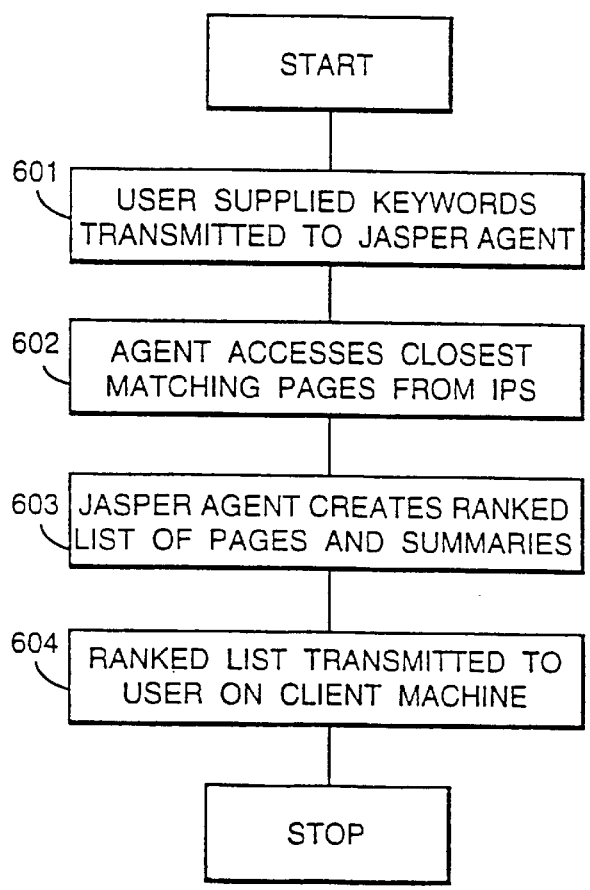

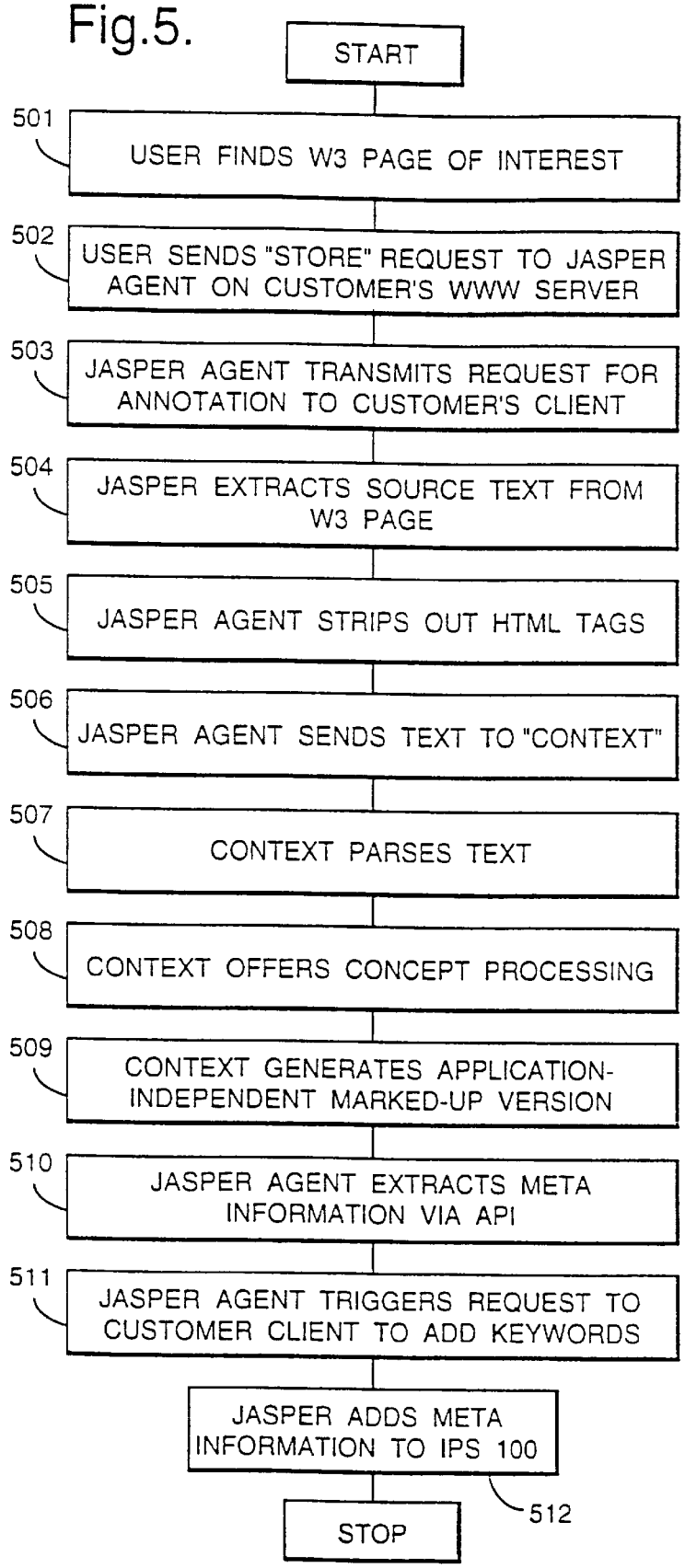

SOFTWARE AGENT FOR COMPARING LOCALLY ACCESSIBLE KEYWORDS WITH META-INFORMATION AND HAVING POINTERS ASSOCIATED WITH DISTRIBUTED INFORMATION

BACKGROUND OF THE INVENTION

1. Field of the Invention

The present invention relates to methods and/or systems for accessing information by means of a communications system.

2. Related Art

The Internet WorldWide Web is a known communications system based on a plurality of separate communications networks connected together. It provides a rich source of information from many different providers but this very richness creates a problem in accessing specific information as there is no central monitoring and control.

In 1982, the volume of scientific, corporate and technical information was doubling every 5 years. By 1988, it was doubling every 2.2 years and by 1992 every 1.6 years. With the expansion of the Internet and other networks the rate of increase will continue to increase. Key to the viability of such networks will be the ability to manage the information and provide users with the information they want, when they want it.

SUMMARY OF THE INVENTION

According to an embodiment of the present invention, there is provided an access system, for accessing information stored in a distributed manner and accessible by means of a communications network, the access system comprising a plurality of software agents such that a user can access information, using the network, by means of an agent, wherein each agent is provided with an intelligent page store, for storing summaries, together with associated data, of pieces of information accessible via the network, and multiple keyword stores for storing sets of keywords such that the agent can identify information for which an entry is made in the intelligent page store by applying either or both of first and second sets of keywords to entries in said page store.

In a useful configuration, the first and second sets of keywords may be associated with different respective users.

An agent might then be triggered to apply keyword sets to pages of information in (or being added to) the page store by different circumstances for different users. For instance, an agent might apply a first set of keywords in the course of a storage request from a first user. However, the agent might then apply one or more additional sets of keywords in order to notify one or more other users of the entry.

Preferably, a group of agents will share an intelligent page store, although there may be multiple intelligent page stores in or available to the access system as a whole. This sharing of a page store provides a way of enabling an agent to monitor new entries to the page store for notification to potentially interested users.

Embodiments of the present invention provide a distributed system of intelligent software agents which can be used to perform information tasks, for instance over the Internet WorldWide Web (W3), on behalf of a user or community of users. That is, software agents are used to store, retrieve, summarise and inform other agents about information found on W3.

Network systems such as W3 are known and are built according to known architectures such as the client/server type of architecture and further detail is not therefore given herein.

The present invention is not concerned with providing another tool for searching systems such as W3: there are already many of these. They are being added to frequently with ever increasing coverage of the Web and sophistication of search engines. Instead, embodiments of the present invention relate to the following problem: having found useful information on W3, how can it be stored for easy retrieval and how can other users likely to be interested in the information be identified and informed?

Software agents provide a known approach to dealing with distributed rather than centralised computer-based systems. Each agent generally comprises functionality to perform a task or tasks on behalf of an entity (human or machine-based) in an autonomous manner, together with local data, or means to access data, to support the task or tasks. In the present specification, agents for use in storing or retrieving information in embodiments of the present invention are referred to for simplicity as "Jasper agents", this stemming from the acronym "Joint Access to Stored Pages with Easy Retrieval".

Given the vast amount of information available on W3, it is preferable to avoid the copying of information from its original location to a local server. Indeed, it could be argued that such an approach is contrary to the whole ethos of the Web. Rather than copying information, therefore, Jasper agents store only relevant "meta-information". As will be seen below, this meta-information can be thought of as being at a level above information itself, being about it rather than being actual information. It can include for instance keywords, a summary, document title, universal resource locator (URL) and date and time of access. This meta-information is then used to provide a pointer to, or to "index on", the actual information when a retrieval request is made.

Most known W3 clients (Mosaic, Netscape, and so on) provide some means of storing pages of interest to the user. Typically, this is done by allowing the user to create a (possibly hierarchical) menu of names associated with particular URLs. While this menu facility is useful, it quickly becomes unwieldy when a reasonably large number of W3 pages are involved. Essentially, the representation provided is not rich enough to allow capture of all that might be required about the information stored: the user can only provide a string naming the page. As well as the fact that useful meta-information such as the date of access of the page is lost, a single phrase (the name) may not be enough to accurately index a page in all contexts.

Consider as a simple example information about the use of knowledge-based systems (KBS) in information retrieval of pharmacological data: in different contexts, it may be any of KBS, information retrieval or pharmacology which is of interest. Unless a name is carefully chosen to mention all three aspects, the information will be missed in one or more of its useful contexts. This problem is analogous to the problem of finding files containing desired information in a Unix (or other) file system as described in the paper by Jones, W. P.; "On the applied use of human memory models: the memory extender personal filing system" published in Int J. Man-Machine Studies, 25, 191–228, 1986. In most filing systems however there is at least the facility of sorting files by creation date.

The solution to this problem adopted in embodiments of the present invention is to allow the user to access information by a much richer set of meta-information. How Jasper agents achieve this and how the resulting meta-information is exploited is explained below.

BRIEF DESCRIPTION OF THE DRAWINGS

An information access system according to an embodiment of the present invention will now be described, by way of example only, with reference to the accompanying Figures in which:

FIG. 4 shows in schematic format retrieval processes offered by the access system;

FIG. 5 shows a flow diagram for the storage process of FIG. 2;

FIGS. 6, 7 and 8 show flow diagrams for three information retrieval processes using a Jasper access system.

DETAILED DESCRIPTION OF EXEMPLARY EMBODIMENTS

Figure 1:
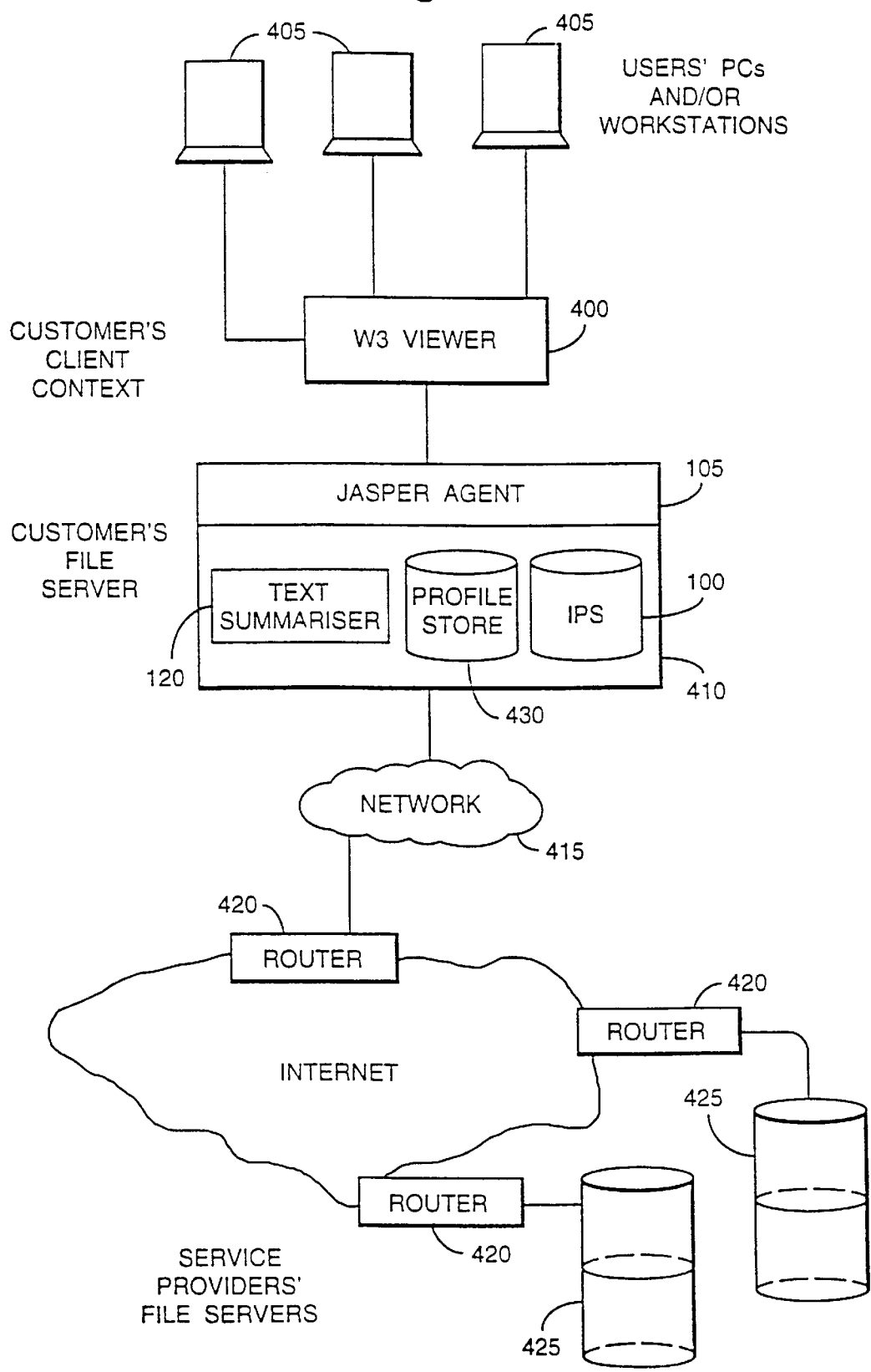
FIG. 1 shows an information access system incorporating a Jasper agent system.

Referring to FIG. 1, an information access system according to an embodiment of the present invention may be built into a known form of information retrieval architecture, such as a client-server type architecture connected to the Internet.

In more detail, a customer, such as an international company, may have multiple users equipped with personal computers or workstations 405. These may be connected via a World Wide Web (WWW) viewer 400 in the customer's client context to the customer's WWW file server 410. The Jasper agent 105, effectively an extension of the viewer 400, may be actually resident on the WWW file server 410.

The customer's WWW file server 410 is connected to the Internet in known manner, for instance via the customer's own network 415 and a router 420. Service providers' file servers 425 can then be accessed via the Internet, again via routers.

Also resident on, or accessible by, the customer's file server 410 are a text summarising tool 120 and two data stores, one holding user profiles (the profile store 430) and the other (the intelligent page store 100) holding principally metainformation for a document collection.

In a Jasper agent based system, the agent 105 itself can be built as an extension of a known viewer such as Netscape. The agent 105 is effectively integrated with the viewer 400, which might be provided by Netscape or by Mosaic etc, and can extract W3 pages from the viewer 400.

As described above, in the client-server architecture, the text summariser 120 and the user profile both sit on file in the customer file server 410 where the Jasper agent is resident. However, the Jasper agent 105 could alternatively appear in the customer's client context.

A Jasper agent, being a software agent, can generally be described as a software entity, incorporating functionality for performing a task or tasks on behalf of a user, together with local data, or access to local data, to support that task or tasks. The tasks relevant in a Jasper system, one or more of which may be carried out by a Jasper agent, are described below. The local data will usually include data from the intelligent page store 100 and the profile store 430, and the functionality to be provided by a Jasper agent will generally include means to apply a text summarising tool and store the results, access or read, and update, at least one user profile, means to compare keyword sets with other keyword sets, or meta-information, and means to trigger alert messages to users.

In preferred embodiments, a Jasper agent will also be provided with means to monitor user inputs for the purpose of selecting a keyword set to be compared.

In further preferred embodiments, a Jasper agent is provided with means to apply an algorithm in relation to first and second keyword sets to generate a measure of similarity therebetween. According to the measure of similarity, either the first or second keyword sets may then be proactively updated by the Jasper agent, or the result of comparing the first or second keyword sets with a third keyword set, or with meta-information, may be modified.

Embodiments of the present invention might be built according to different software systems. It might be convenient for instance that object-oriented techniques are applied. However, in embodiments as described below, the server will be Unix based and able to run ConText, a known natural language processing system offered by Oracle Corporation, and a W3 viewer. The system might generally be implemented in "C" although the client might potentially be any machine which can support a W3 viewer.

In the following section, the facilities which Jasper agents offer the user in managing information are discussed. These can be grouped in two categories, storage and retrieval.

Storage

Figure 2:
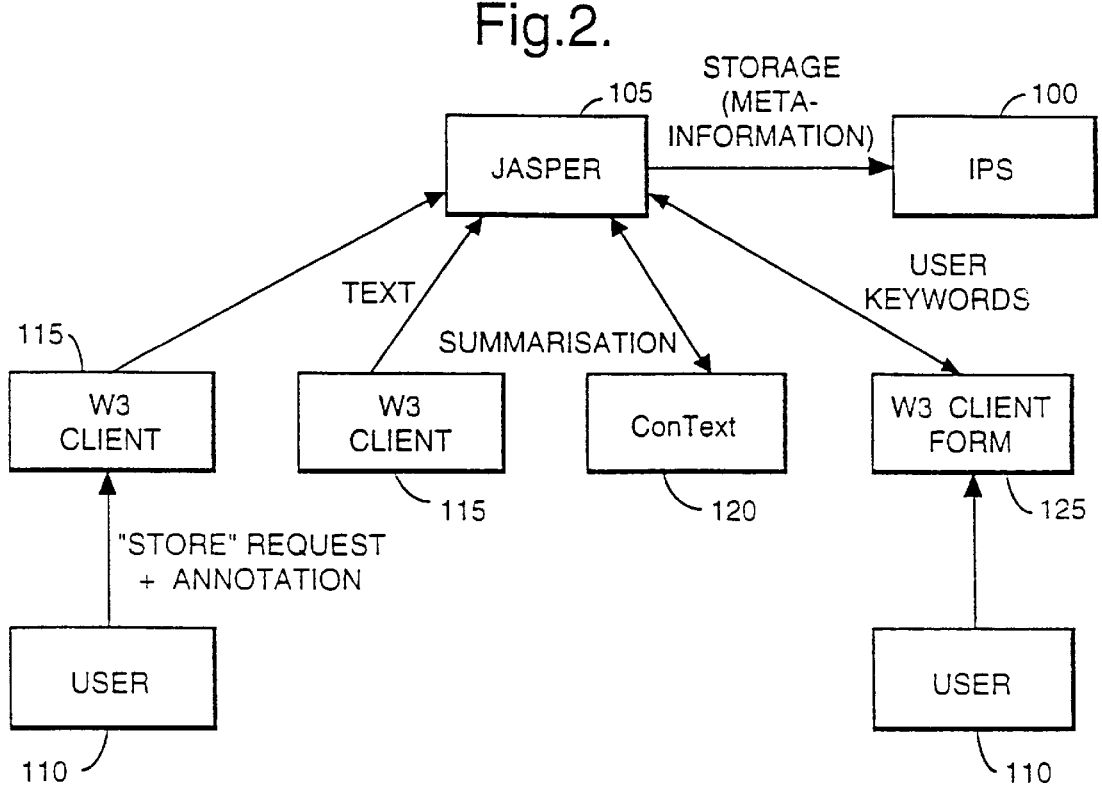
FIG. 2 shows in schematic format a storage process offered by the access system.

FIGS. 2 and 5 show the actions taken when a Jasper agent 105 stores information in an intelligent page store (IPS) 100. The user 110 first finds a W3 page of sufficient interest to be stored by the Jasper system in an IPS 100 associated with that user (STEP 501). The user 110 then transmits a 'store' request to the Jasper agent 105, resident on the customer's WWW file server 410, via a menu option on the user's selected W3 client 115 (Mosaic and Netscape versions are currently available on all platforms) (STEP 502). The Jasper agent 105 then invites the user 110 to supply an associated annotation, also to be stored (STEP 503). Typically, this might be the reason the user is interested in the page and can be very useful for other users in deciding which pages retrieved from the IPS 100 to visit. (Information sharing is further discussed below.)

The Jasper agent 105 next extracts the source text from the page in question, again via the W3 client 115 on W3 (STEP 504). Source text is provided in a "HyperText" format and the Jasper agent 105 first strips out HyperText Markup Language (HTML) tags (STEP 505). The Jasper agent 105 then sends the text to a text summariser such as "ConText" 120 (STEP 506).

ConText 120 first parses a document to determine the syntactic structure of each sentence (STEP 507). The ConText parser is robust and able to deal with a wide range of the syntactic phenomena occurring in English sentences. Following sentence level parsing, ConText 120 enters its 'concept processing' phase (STEP 508). Among the facilities offered are:

Information Extraction: a master index of a document's contents is computed, indexing over concepts, facts and definitions in the text.

Content Reduction: several levels of summarisation are available, ranging From a list of the document's main themes to a precis of the entire document.

Discourse Tracking: by tracking the discourse of a document, ConText can extract all the parts of a document which are particularly relevant to a certain concept.

ConText 120 is used by the Jasper agent 105 in a client-server architecture: after parsing the documents, the server generates application-independent marked-up versions (STEP 509). Calls from the Jasper agent 105 using an Applications Programming Interface (API) can then interpret the mark-ups. Using these API calls, meta-information is obtained from the source text (STEP 510). The Jasper agent 105 first extracts a summary of the text of the page. The size of the summary can be controlled by the parameters passed to ConText 120 and the Jasper agent 105 ensures that a summary of 100–150 words is obtained. Using a further call to ConText 120, the Jasper agent 105 then derives a set of keywords from the source text. Following this, the user may optionally be presented with the opportunity to add further keywords via an HTML form 125 (STEP 511). In this way, keywords of particular relevance to the user can be provided, while the Jasper agent 105 supplies a set of keywords which may be of greater relevance to a wider community of users.

At the end of this process, the Jasper agent 105 has generated the following meta-information about the W3 page of interest:

the ConText-supplied general keywords;

user-specific keywords;

the user's annotations;

a summary of the page's content;

the document title;

universal resource location (URL) and date and time of storage.

Figure 3:
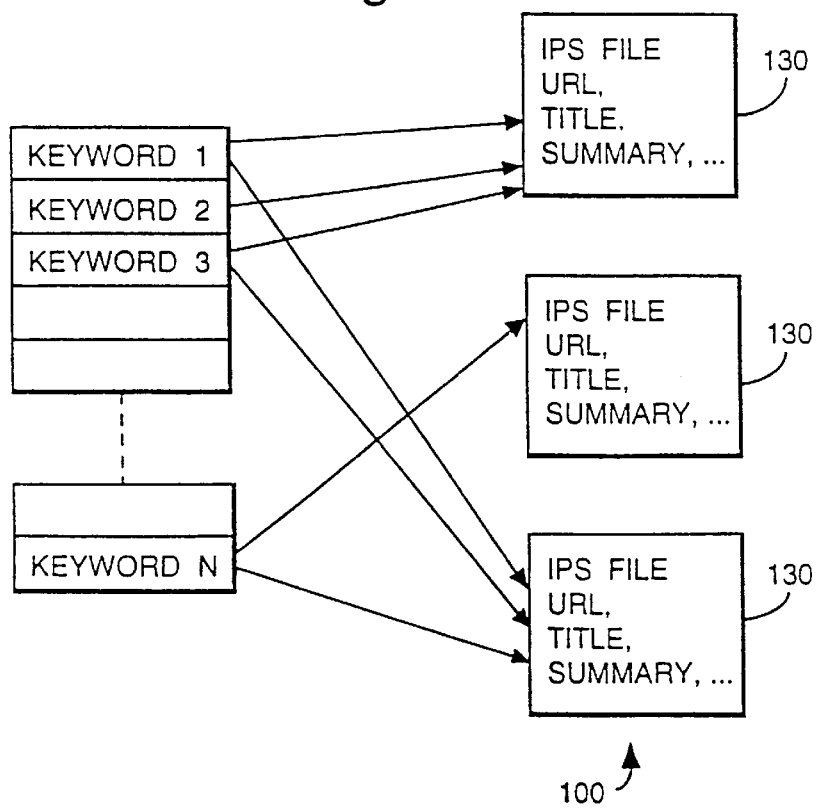
FIG. 3 shows the structure of an intelligent page store for use in the storage process of FIG. 1.
Figure 7:
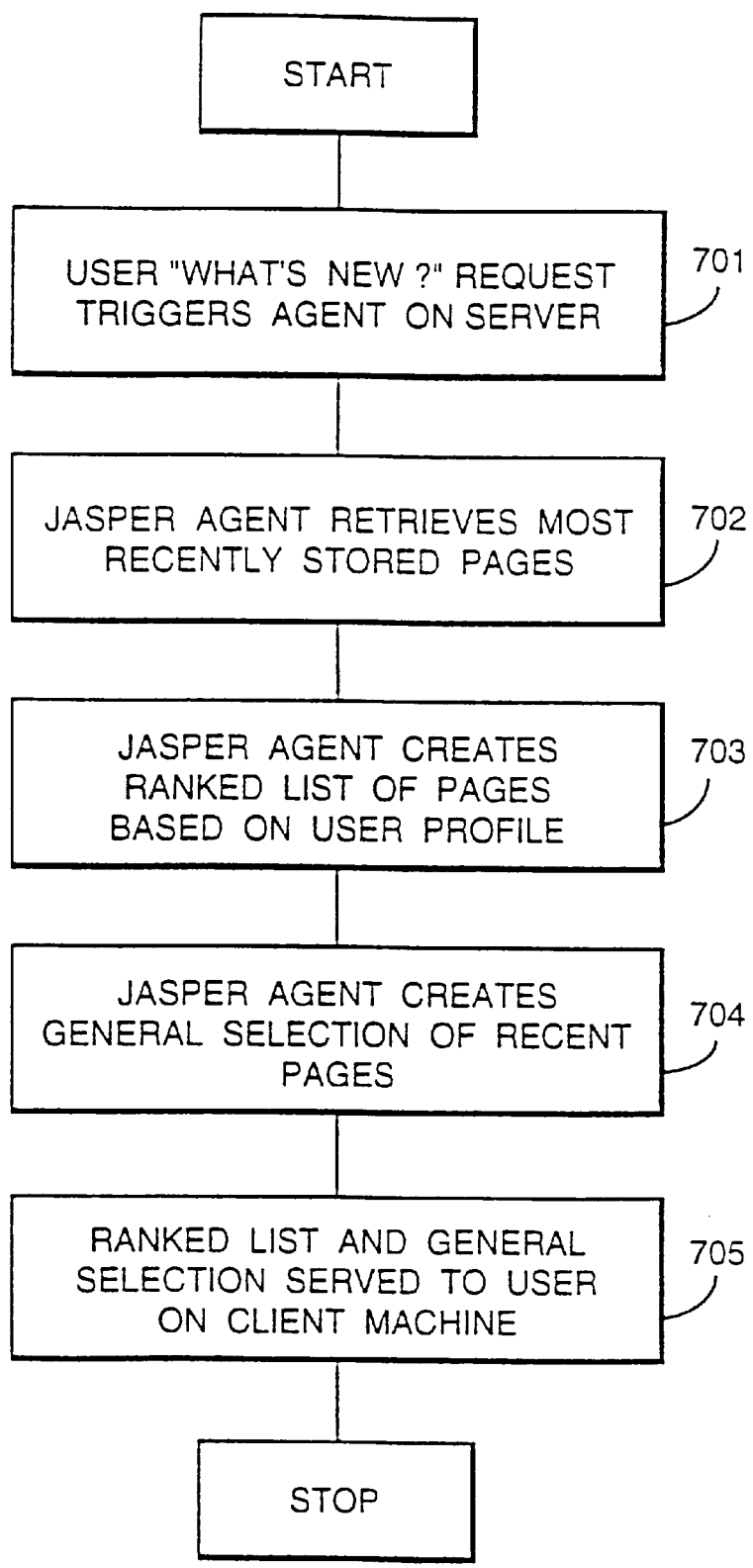

Referring additionally to FIG. 3, the Jasper agent 105 then adds this meta-information for the page to files 130 of the IPS 100 (STEP 512). In the IPS 100, the keywords (of both types) are then used to index on files containing meta-information for other pages.

Retrieval

There are three modes in which information can be retrieved from the IPS 100 using a Jasper agent 105. One is a standard keyword retrieval facility, while the other two are concerned with information sharing between a community of agents and their users. Each will be described in the sections below.

When a Jasper agent 105 is installed on a user's machine, the user provides a personal profile: a set of keywords which describe information the user is interested in obtaining via W3. This profile is held, or at least maintained, by the agent 105 in order to determine which pages are potentially of interest to a user.

Keyword Retrieval

As shown in FIGS. 4, 6, 7 and 8, for straightforward keyword retrieval, the user supplies a set of keywords to the Jasper agent 105 via an HTML form 300 provided by the Jasper agent 105 (STEP 601). The Jasper agent 105 then retrieves the ten most closely matching pages held in IPS 100 (STEP 602), using a simple keyword matching and scoring algorithm. Keywords supplied by the user when the page was stored (as opposed to those extracted automatically by ConText) can be given extra weight in the matching process. The user can specify in advance a retrieval threshold below which pages will not be displayed. The agent 105 then dynamically constructs an HTML form 305 with a ranked list of links to the pages retrieved and their summaries (STEP 603). Any annotation made by the original user is also shown, along with the scores of each retrieved page. This page is then presented to the user on their W3 client (STEP 604).

"What's New?" Facility

Any user can ask a Jasper agent "What's new?" (STEP 701). The agent 105 then interrogates the IPS 100 and retrieves the most recently stored pages (STEP 702). It then determines which of these pages best match the user's profile, again based on a simple keyword matching and scoring algorithm (STEP 703). An HTML page is then presented to the user showing a ranked list of links to the recently stored pages which best match the user's profile, and also to other pages most recently stored in IPS (STEP 704), with annotations where provided. Thus the user is provided with a view both of the pages recently stored and likely to be of most interest to the user, and a more general selection of recently stored pages (STEP 705).

A user can update the profile which his Jasper agent 105 holds at any time via an HTML form which allows him to add and/or delete keywords from the profile. In this way, the user can effectively select different "contexts" in which to work. A context is defined by a set of keywords (those making up the profile, or those specified in a retrieval query) and can be thought of as those types of information which a user is interested in at a given time.

The idea of applying human memory models to the filing of information was explored by Jones in the paper referenced above, in the context of computer filing systems. As he pointed out in the context of a conventional filing system, there is an analogy between a directory in a file system and a set of pages retrieved by a Jasper agent 105. The set of pages can be thought of as a dynamically-constructed directory, defined by the context in which it was retrieved. This is a highly flexible notion of 'directory' in two senses: first, pages which occur in this retrieval can of course occur in others, depending on the context; and, second, there is no sharp boundary to the directory: pages are 'in' the directory to a greater or lesser extent depending on their match to the current context. In the present approach, the number of ways of partitioning the information on the pages is thus only limited by the diversity and richness of the information itself.

Communication with other interested agents

Figure 8:
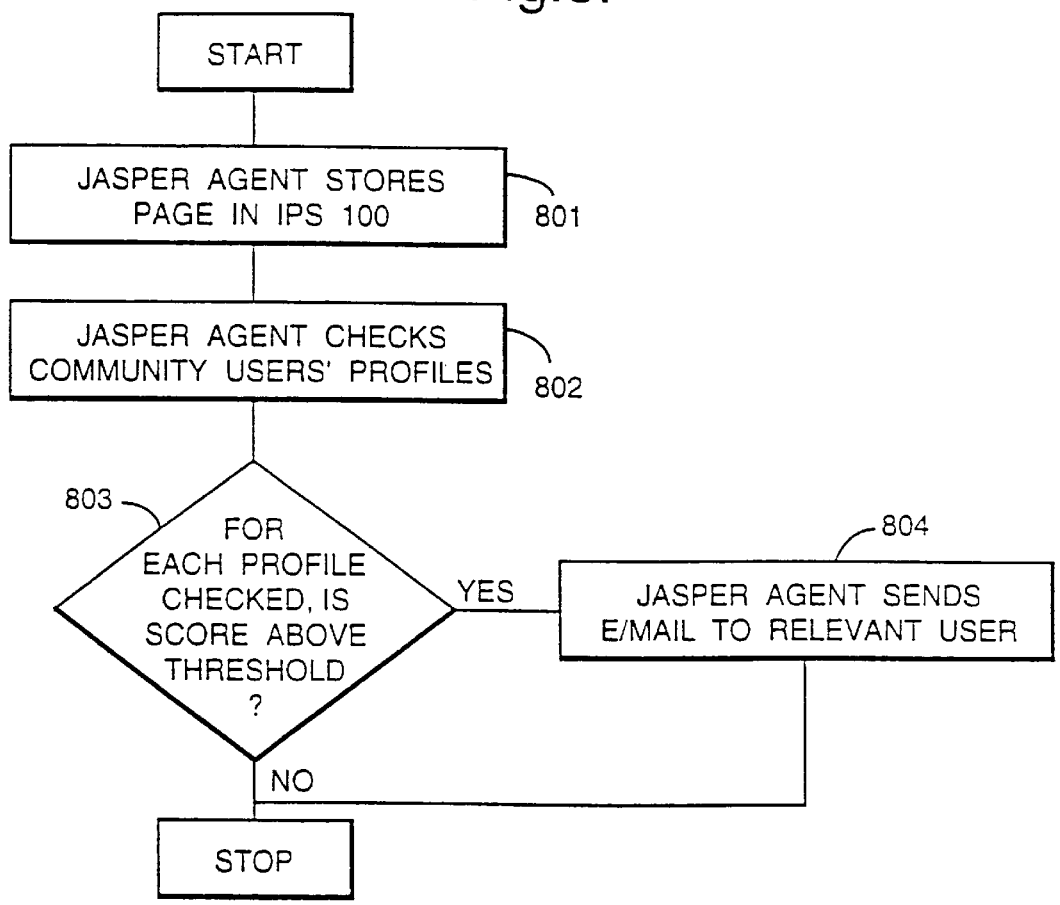

Referring to FIG. 8, when a page is stored in IPS 100 by a Jasper agent 105 (STEP 801), the agent 105 checks the profiles of other agents' users in its 'local community' (STEP 802), This local community could be any predetermined community. If the page matches a user's profile with a score above a certain threshold (STEP 803), a message, for instance an "email" message, can be automatically generated by the agent 105 and sent to the user concerned (STEP 804), informing him of the discovery of the page.

The email header might be for instance in the format:

JASPER KW: (keywords)

This allows the user before reading the body of the message to identify it as being one from the Jasper system. Preferably, a list of keywords is provided and the user can assess the relative importance of the information to which the message refers. The keywords in the message header vary from user to user depending on the keywords from the page which match the keywords in their user profile, thus personalising the message to each user's interests. The message body itself can give further information such as the page title and URL, who stored the page and any annotation on the page which the storer provided.

The Jasper agent 105 and system described above provide the basis for an extremely useful way of accessing relevant information in a distributed arrangement such as W3. Variations and extensions may be made in a system without departing from the scope of the present invention. For instance, at a relatively simple level, improved retrieval techniques might be employed. As examples, vector space or probabilistic models might be used, as described by G Salton in "Automatic Text Processing", published in 1989 by Addison-Wesley in Reading, Mass., USA.

Alternatively, indexing might be made more versatile by providing indexing on meta-information other than keywords. For instance, extra meta-information might be the date of storage of a page and the originating site of the page (which Jasper can extract from the URL.) These extra indices allow users (via an HTML form) to frame commands of the type:

Show me all pages I stored in 1994 from Cambridge University about artificial intelligence and information retrieval.

In another alternative version, a thesaurus might be used by Jasper agents 105 to exploit keyword synonyms. This reduces the importance of entering precisely the same keywords as were used when a page was stored. Indeed, it is possible to exploit the use of a thesaurus in several other areas, including the personal profiles which an agent 105 holds for its user.

Adaptive Agents

The use of user profiles by Jasper agents 105 to determine information relevant to their users, though powerful can be improved. When the user wants to change context (perhaps refocussing from one task to another, or from work to leisure), the user profile must be respecified by adding and/or deleting keywords. A better approach is for the agent to change the user's profile as the interests of the user change over time. This change of context can occur in two ways: there can be a short-term switch of context from, for example, work to leisure. The agent can identify this from a list of current contexts it holds for a user and change into the new context. This change could be triggered, for example, when a new page of different information type is visited by the user. There can also be longer term changes in the contexts the agent holds based on evolving interests of the user. These changes can be inferred from observation of the user by the agent. For instance, known techniques which might be employed in an adaptive agent include genetic algorithms, learning from feedback and memory-based reasoning. Such techniques are disclosed in an internal report of the MIT made available in 1993, by Sheth B. & Maes. P., called "Evolving Agents for Personalised Information Filtering".

Integration of Remote and Local Information

Another possible variation of a Jasper system would be to integrate the user's own computer filing system with the IPS 100, so that information found on W3 and on the local machine would appear homogenous to the user at the top level. Files could then be accessed similarly to the way in which Jasper agents 105 access W3 pages, freeing the user from the constraints of name-oriented filing systems and providing a contents-addressable interface to both local and remote information of all kinds.

Clustering in Jasper Systems

The Jasper IPS 100 and the related documents can essentially be called a collection; it is a set of documents indexed by keywords. It differs from a 'traditional' collection in that the documents are typically located remotely from the index; the index (the IPS 100) actually points to a URL which specifies the location of the document on the Internet. Furthermore, various additional pieces of meta-information are attached to documents in a Jasper system, such as the user who stored the page, when it was stored, any annotation the user may have provided and so forth.

One important area where a Jasper system differs from most document collections is that each document has been entered in the IPS 100 by a user who made a conscious decision to mark it as a piece of information which he and his peers would be likely to find useful in the future. This, along with the meta-information held, makes a Jasper IPS 100 a very rich source of information.

It has also been examined whether known Information Retrieval (IR) techniques can beneficially applied to the Jasper IPS 100. In particular, the use of clustering has been under investigation.

Clustering Documents

Using known IR techniques, Jasper's term-document matrix can be used to calculate a similarity matrix for the documents identified in the Jasper IPS 100. The similarity matrix gives a measure of the similarity of documents identified in the store. For each pair of documents the Dice coefficient is calculated. For two documents Di and Dj.

$$2*[Di \cap Dj]/[Di]+[Dj]$$

where [X] is the number of terms in X and X∩Y is the number of terms co-occurring in X and Y. This coefficient yields a number between 0 and 1. A coefficient of zero implies two documents have no terms in common, while a coefficient of 1 implies that the sets of terms occurring in each document are identical. The similarity matrix, Sim say, represents the similarity of each pair of documents in the store, so that for each pair of documents i and j.

$$Sim(i,j)=2*[Di \cap Dj]/[Di]+[Dj]$$

This matrix can be used to create clusters of related documents automatically, using the hierarchical agglomerative clustering process described in "Hierarchic Agglomerative Clustering Methods for Automatic Document Classification" by Griffiths A et al in the Journal of Documentation, 40:3, September 1984, pp 175–205. In such a process, each document is initially placed in a cluster by itself and the two most similar such clusters are then combined into a larger cluster, for which similarities with each of the other clusters must then be computed. This combination process is continued until only a single cluster of documents remains at the highest level.

The way in which similarity between clusters (as opposed to individual documents) is calculated can be varied. For a Jasper store, "complete-link clustering" can be employed. In complete-link clustering, the similarity between the least similar pair of documents from the two clusters is used as the cluster similarity.

The resulting cluster structures of the Jasper store can then be used to create a three-dimensional (3D) front end onto the Jasper system using the VRML (Virtual Reality Modelling Language). (VRML is a known language for 3D graphical spaces or virtual worlds networked via the global Internet and hyperlinked within the World Wide Web).

Clustering Keywords

Keywords (terms) occurring in relation to a particular JASPER document collection can also be clustered in a way which mirrors exactly the document cluster technique described above: a similarity matrix for the keywords in the Jasper store can be constructed which gives a measure of the 'similarity' of keywords in the store. For each pair of documents, the Dice coefficient is calculated. For two keywords Ki and Kj, the Dice coefficient is given by:

$$2*[Ki \cap Kj]/[Ki]+[Kj]$$

where [X] is the number of documents in which X occurs and X∩Y is the number of documents in which X and Y co-occur.

Once the similarity matrix for a Jasper store is calculated, however, it is not necessary to cluster the keywords as the documents were clustered. Instead it is possible to exploit the matrix itself in two ways, described below.

The first way is profile enhancement. Here, the user profile can be enhanced by using those keywords most similar to the keywords in the user's profile. Thus for example, if the words virtual, reality and Internet are part of a user's profile but VRML is not, an enhanced profile might add VRML to the original profile (assuming VRML is clustered close to virtual, reality and Internet). In this way, documents containing VRML but not virtual, reality and Internet may be retrieved whereas they would not have been with the unenhanced profile.

Figure 9:
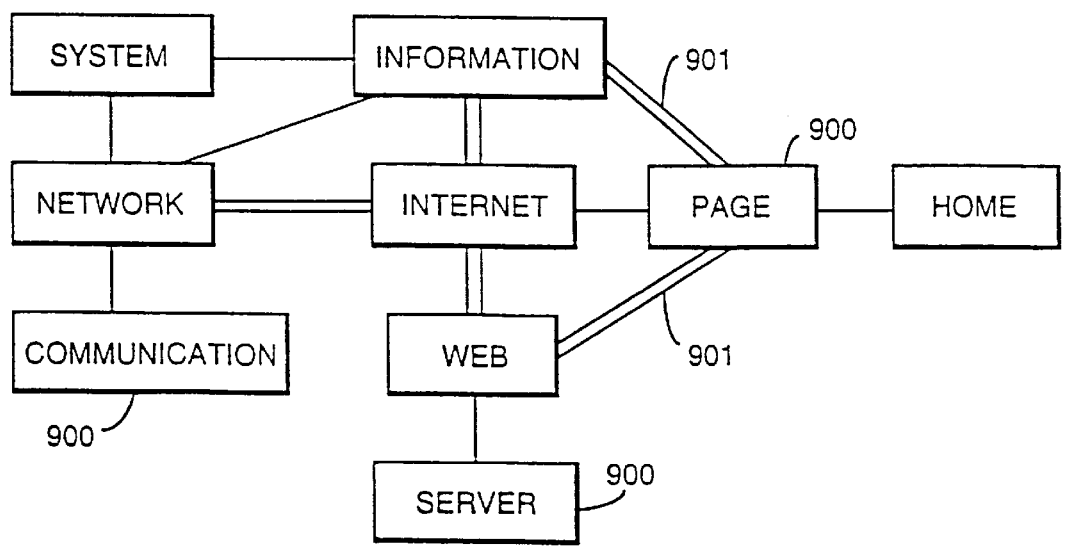
FIG. 9 shows a keyword network generated using a clustering technique, for use in extending and/or applying user profiles in a Jasper system.

FIG. 9 shows an example network of keywords 900 which has been built from the keyword similarity matrix extracted from a current Jasper store. The algorithm is straightforward: given an initial starting keyword, find the four words most similar to it from the similarity matrix. Link these four to the original word and repeat the process for each of the four new words. This can be repeated a number of times (in FIG. 9, three times). Double lines 901 between two words indicate that both words occur in the other's four most similar keywords. One could of course attach the particular similarity coefficients to each link for finer-grained information concerning the degree of similarity between words.

The second way is proactive searching. The keywords comprising a user's profile can be used to search for new WWW pages relevant to their interest proactively by Jasper, which can then present a list of new pages which the user may be interested in without the user having to carry out a search explicitly. These proactive searches can be carried out by a Jasper system at some given interval, such as weekly. Clustering is useful here because a profile may reflect more than one interest. Consider, for example, the following user profile: Internet, WWW, html, football, Manchester, united, linguistics, parsing, pragmatics. Clearly, three separate interests are represented in the above profile and searching on each separately is likely to yield far superior results than merely entering the whole profile as a query for the given user. Clustering keywords from the document collection can automate the process of query generation for proactive searching by a user's Jasper agent.

When the search results are obtained by Jasper, they can be summarised and matched against the user's profile in the usual way to give a prioritised list of new URLs along with locally held summaries.

Other text summarisers may be used in place of ConText. For instance, NetSumm is a summarising tool made available by British Telecommunications plc on the Internet, at http://www.labs.bt.com/innovate/informat/netsumm/index.htm.

Although described in relation to locating information via Internet, embodiments of the present invention might be found useful for locating information on other systems, such as documents on a user's internal systems which are in HyperText.

Further to the inventive aspects of the present system set out in the introduction to this specification, the following should also be viewed as expressions of novel and advantageous features of the system:

A method of monitoring information inputs to a data store, the inputs being requested by any of a plurality of users, for the purpose of alerting a first user to an input by a second user in accordance with alert criteria determined at least in part by said first user, the method comprising:
 i) storing a user profile for each user, which profile comprises at least one set of keywords and an identifier for the user;
 ii) detecting a request by the second user for an information input to the data store;
 iii) processing the request to generate the information input;
 iv) comparing the information input with a keyword set from the user profile for the first user; and
 v) in the event of a positive result from the comparison, transmitting an alert message addressed to the first user.

A method as above which further comprises monitoring information input requests by respective users and, on detection of a significant change in the information input requests made by a particular user, changing the keyword set used in step iv) for that particular user in the event of an information input request by a different user.

A method as above wherein each information input includes at least one set of keywords associated with a respective document, and wherein the method further comprises the steps of generating a similarity matrix for at least two of said sets of keywords, and using said similarity matrix to extend the scope of a keyword set from a user profile in step iv) so as to obtain an increase in the number of positive results for the associated user.

A method as above which further comprises the step of applying a clustering algorithm to a keyword set from a user profile so as to divide the keyword set into sub-keyword sets and applying at least one of the sub-keyword sets in place of the full keyword set in step iv).

What is claimed is:

1. An information access system, for accessing information stored in a distributed manner and accessible by means of a communications network, said access system comprising:
 at least one software agent for use in accessing said information by means of said network,
 data storage locally accessible to said agent for storing meta-information including a pointer associated with pieces of said information where stored in said distributed manner for making it thereafter accessible via said network, and for storing at least one set of keywords,
 said agent being triggered on entry of meta-information in said data storage, to compare said at least one set of keywords to said meta-information and to transmit an alert message back to a user associated with said at least one set of stored keywords in the event of a positive comparison result.

2. A system as in claim 1 wherein:
 said at least one set of keywords is associated with a specified user, and
 said access system comprises means to address the alert message to said specified user.

3. A system as in claim 1 for use by a plurality of users, each of said plurality having at least one associated set of keywords, wherein:
 said system has means to respond to a user request to enter meta-information in said data storage,
 said at least one set of keywords being associated with a user other than the user making the request, such that said system responds to entry of meta-information by a first user by addressing an alert message to a second user in the vent of a positive match with said second user's keyword set.

4. A system as in claim 1 wherein:
 said agent is provided with a thesaurus of synonyms for keywords of said sets so as to increase the number of positive matches with said sets of keywords.

5. A system as in claim 1 wherein:
 said agent is provided with means to monitor inputs of a user, to detect a change in those inputs and to modify or substitute a keyword set associated with said user on detection of a change.

6. A system as in claim 1 wherein:
said system is provided with means to change a keyword set associated with a user in response to a request by that user.

7. A system as in claim 1 wherein:
said system is provided with means to store at least one data clustering algorithm and to apply the algorithm to one or more keyword sets so as to modify said keyword set or sets prior to comparison with meta-information.

8. A system as in claim 1 comprising:
multiple agents, said multiple agents being allocated to different respective users of said system.

9. A method of monitoring meta-information inputted to a meta-information data store, the input meta-information being requested by any of a plurality of users, for the purpose of alerting a first user to input meta-information requested by a second user in accordance with alert criteria determined at least in part by said first user, said method comprising:
   i) storing a user profile for each of said users, which profile comprises at least one set of keywords and an identifier for each of said users;
   ii) detecting a request by said second user for meta-information to be entered to said data store;
   iii) processing said request with a software agent and generating with said agent said meta-information entry;
   iv) automatically comparing said meta-information entry with a keyword set from said user profile for said first user; and
   v) in the event of a positive result from said comparison, automatically generating and transmitting by said agent a message addressed to said first user.

10. A method as in claim 9 which further comprises:
monitoring information input requests by respective users and,
on detection of a significant change in said information input requests made by a particular user, changing said keyword set used in step iv) for that particular user in the event of an information input request by a different user.

11. A method as in claim 9 wherein:
each information input includes at least one set of keywords associated with a respective document,
a similarity matrix is generated for at least two of said sets of keywords, and
said similarity matrix is used to extend the scope of a keyword set from a user profile in step iv) so as to obtain an increase in the number of positive results for said associated user.

12. A method as in claim 9 which further comprises the steps of:
applying a clustering algorithm to a keyword set from a user profile so as to divide said keyword set into sub-keyword sets, and
applying at least one of said sub-keyword sets in place of said full keyword set in step iv).

13. An information access system, for accessing sets of information stored in a distributed manner and accessible by means of a communications network, the access system comprising:
   i) an input for receiving a set of information;
   ii) data storage, or means to access data storage, for storing at least one set of predetermined keywords;
   iii) generation means, triggerable: (a) to generate at least one set of meta-information from the set of information received at the input, the meta-information including at least a pointer for the set of information where stored in said distributed manner, and (b) to locally store the at least one set of meta-information in the data storage;
   iv) comparison means for comparing at least one of the at least one set of stored keywords with the at least one set of meta-information; and
   v) means for automatically generating and transmitting a message back to a user associated with said at least one set of stored keywords in dependence upon the result of the comparison.

14. A system as in claim 13, wherein said at least one set of predetermined keywords is associated with a specified user and system includes means to address the alert message to that user.

15. A system as in claim 13 for use by a plurality of users, each of the plurality of users having at least one associated set of keywords stored in the data storage, wherein the system is triggerable, on activation of the generation means to generate a set of meta-information by a first user, to compare the at least one set of meta-information with at least one set of predetermined keywords associated with a second user and to address an alert message to the second user in dependence upon the result of the comparison.

16. A system as in claim 13 wherein the system is provided with a thesaurus of synonyms for the sets of keywords so as to increase the number of positive matches with the sets of keywords.

17. A system as in claim 13 wherein the system is provided with monitoring means adapted to monitor information sets selected for input by a user, to detect a change in the information sets so selected and to modify or substitute a keyword set associated with that user on detection of the change.

18. A system as in claim 13 wherein the system is provided with means to change a keyword set associated with a user in response to a request by that user.

19. A system as in claim 13 wherein the system is further provided with at least one data clustering means adapted to operate according to at least one data clustering algorithm and wherein said system is further adapted to apply the data clustering means to one or more keyword sets so as to modify the keyword set or sets prior to comparison with a set of said meta-information.

20. A system as in claim 13 comprising a plurality of software agents, each agent comprising elements i) to v), and each agent being allocated to a different respective user of the system.

21. A system as in claim 13 wherein said pointer comprises at least an address for accessing the information set by means of the communications network.

22. A system as in claim 13 wherein said generation means comprises summary means for generating a summary of the information set.

23. A method of monitoring information sets stored in a distributed manner and accessible by means of a communications network for the purpose of alerting a first user in accordance with alert criteria determined at least in part by the first user to a locally accessible stored corresponding meta-information set identified by a second user, the method comprising:
   i) locally accessing a stored user profile for each of said users, which profile comprises at least one set of keywords and an identifier for each of said users;
   ii) detecting a request by the second user to store, in a meta-information data store, meta-information relating to the identified information set;

iii) in response to the request, using a software agent to generate a set of meta-information dependent on the identified information set;

iv) automatically comparing the generated set of meta-information with a keyword set from the user profile for the first user; and v) in dependence upon the result from the comparison, automatically generating and transmitting by said agent a message addressed to the first user.

24. A method as in claim 23 which further comprises monitoring information input requests by respective users and, on detection of a significant change in the information input requests made by a particular user, changing the keyword set used in step iv) for that particular user in the event of an information input request by a different user.

25. A method as in claim 23 wherein each information input includes at least one set of keywords associated with a respective document, and wherein the method further comprises the steps of generating a similarity matrix for at least two of the sets of keywords, and using the similarity matrix to extend the scope of a keyword set from a user profile in step iv) so as to obtain an increase in the number of positive results for the associated user.

26. A method as in claim 23 which further comprises the step of applying a clustering algorithm to a keyword set from a user profile so as to divide the keyword set into sub-keyword sets and applying at least one of the sub-keyword sets in place of the full keyword set in step iv).

27. An information access system, for accessing sets of information stored in a distributed manner and accessible by means of a communication network, the access system comprising:

i) an input for receiving a set of information;

ii) means to locally access data storage storing at least one set of predetermined keywords;

iii) generation means, triggerable: (a) to generate at least one set of meta-information from the set of information received at the input, the meta-information including at least a pointer for the set of information when stored in said distributed manner, and (b) to store said set of meta-information when stored in the data storage;

iv) clustering means, adapted to operate according to at least one keyword clustering algorithm, arranged to operate on a stored set of keywords to modify the keyword set with reference to meta-information stored in the data storage; and v) searching means to apply a keyword set modified by the clustering means to search for further information sets.

28. A method of accessing sets of information stored in a distributed manner and accessible by means of a communications network, the method including the steps of:

i) locally accessing, for each of one or more users, a stored user profile comprising at least one set of keywords and an identifier for the user;

ii) receiving a plurality of information sets identified by one or more users and using an adaptive software agent to generate and store a set of meta-information in respect of each said identified information set;

iii) applying, to keywords in a user profile, a keyword clustering algorithm operating with reference to the stored meta-information to modify the user profile; and iv) using the modified user profile from step iii) with said agent to identify one or more further sets of information, wherein said adaptive agent provides storing locally accessible said meta-information including a pointer and keywords based on information gathered from a distributed network.

29. A method as in claim 28 wherein at step iii), the clustering algorithm calculates a measure of the relationship between a selected pair of keywords in terms of the frequency of occurrence of one or both keywords in information sets referenced by the stored meta-information, thereby associating keywords having the closest measured relationship and dividing the user profile into sub-sets of associated keywords.

30. A method as in claim 28 wherein at step iii), the clustering algorithm is arranged to identify one or more keywords in the store, other than those in the user profile, clustered in close association with one or more keywords in the user profile, and wherein the user profile is modified through addition of the one or more identified keywords to the profile.

31. An information access system as in claim 1, 13 or 27 wherein said software agent is adaptive so as to alter its method of operation in response to the content of information that it accesses.

32. An information access system as in claim 1, 13 or 27 wherein said software agent pro actively suggests to a user the altering or adding of at least one key word associated with that user in response to the content of information that it accesses using an existing set of key words for that user.

33. A method as in claim 9, 23 or 28 wherein said software agent is adaptive so as to alter its method of operation in response to the content of information that it accesses.

34. A method as in claim 9, 23 or 28 wherein said software agent pro actively suggests to a user the altering or adding of at least one key word associated with that user in response to the content of information that it accesses using an existing set of key words for that user.

* * * * *